United States Patent
Watanabe et al.

(10) Patent No.: US 8,938,335 B2
(45) Date of Patent: Jan. 20, 2015

(54) CONTROL UNIT FOR VEHICLE STEERING SYSTEM

(75) Inventors: Takeshi Watanabe, Kashihara (JP); Atsushi Ishihara, Yamatokoriyama (JP); Hiroshi Yoshimoto, Nara (JP)

(73) Assignee: JTEKT Corporation, Osaka (JP)

( * ) Notice: Subject to any disclaimer, the term of this patent is extended or adjusted under 35 U.S.C. 154(b) by 41 days.

(21) Appl. No.: 13/602,550

(22) Filed: Sep. 4, 2012

(65) Prior Publication Data
US 2013/0066521 A1 Mar. 14, 2013

(30) Foreign Application Priority Data
Sep. 14, 2011 (JP) ................................. 2011-200872

(51) Int. Cl.
*B62D 6/00* (2006.01)
*B62D 15/02* (2006.01)

(52) U.S. Cl.
CPC .............. *B62D 6/002* (2013.01); *B62D 15/025* (2013.01)
USPC .......................................................... 701/41

(58) Field of Classification Search
None
See application file for complete search history.

(56) References Cited

U.S. PATENT DOCUMENTS

| 7,275,617 B2 * | 10/2007 | Endo et al. ..................... 180/402 |
| 2005/0267661 A1 * | 12/2005 | Iwazaki et al. .................. 701/41 |
| 2008/0097670 A1 | 4/2008 | Ogawa et al. |

FOREIGN PATENT DOCUMENTS

JP A-06-336170 12/1994

OTHER PUBLICATIONS

Mar. 25, 2013 Extended European Search Report issued in European Patent Application No. EP 12 18 3253.
Chinese Patent Office, Notification of the First Office Action mailed Aug. 12, 2014 in Chinese Patent Application No. 201210337867.7 w/English-language Translation.

* cited by examiner

*Primary Examiner* — Thomas Tarcza
*Assistant Examiner* — Garrett Evans
(74) *Attorney, Agent, or Firm* — Oliff PLC

(57) ABSTRACT

In a control unit for a vehicle steering system, which controls an electric motor that is used to change a steering angle on the basis of a target route for a vehicle, a turning angle of a steered wheel with respect to a central axis of a shock absorber is set as a steered element angle, and the steered element angle is used in control over the electric motor.

4 Claims, 7 Drawing Sheets

US 8,938,335 B2

CONTROL UNIT FOR VEHICLE STEERING SYSTEM

INCORPORATION BY REFERENCE/RELATED APPLICATION

This application claims priority to Japanese Patent Application No. 2011-200872 filed on Sep. 14, 2011 the disclosure of which, including the specification, drawings and abstract, is incorporated herein by reference in its entirety.

BACKGROUND OF THE INVENTION

1. Field of the Invention

The invention relates to a control unit for a vehicle steering system, which controls an electric motor to change a steering angle on the basis of a target route for a vehicle.

2. Discussion of Background

Japanese Patent Application Publication No. 6-336170 (JP 6-336170 A) describes a control unit for a vehicle steering system. The control unit sets a target route on the basis of vehicle front view image monitoring data and changes a steering angle by driving an electric motor on the basis of the target route.

When a steered mechanism operates in accordance with the rotation of a steering shaft, a distortion occurs in components of the steered mechanism. However, the control unit described in JP 6-336170 A controls the electric motor without taking into account a distortion of the steered mechanism. Therefore, there is a possibility that an amount of change in steering angle obtained through the control over the electric motor may deviate from an amount of change in steered angle.

SUMMARY OF THE INVENTION

The invention provides a control unit for a vehicle steering system, which is able to reduce a deviation of a vehicle travelling route from a target route.

According to a feature of an example of the invention, in a control unit for a vehicle steering system that includes: a steering shaft that is used to change a steered angle that is a turning angle of a steered wheel of a vehicle; an electric motor that is used to change a steering angle that is a rotation angle of the steering shaft; and a steered mechanism that steers the steered wheel upon receiving rotation of the steering shaft, the control unit controlling the electric motor to change the steering angle based on a target route for the vehicle, a member that rotates in accordance with an operation for changing the steered angle in the steered mechanism is set as a steered rotation member, a rotation angle of the steered rotation member is set as a steered element angle, and the steered element angle is used in control over the electric motor.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
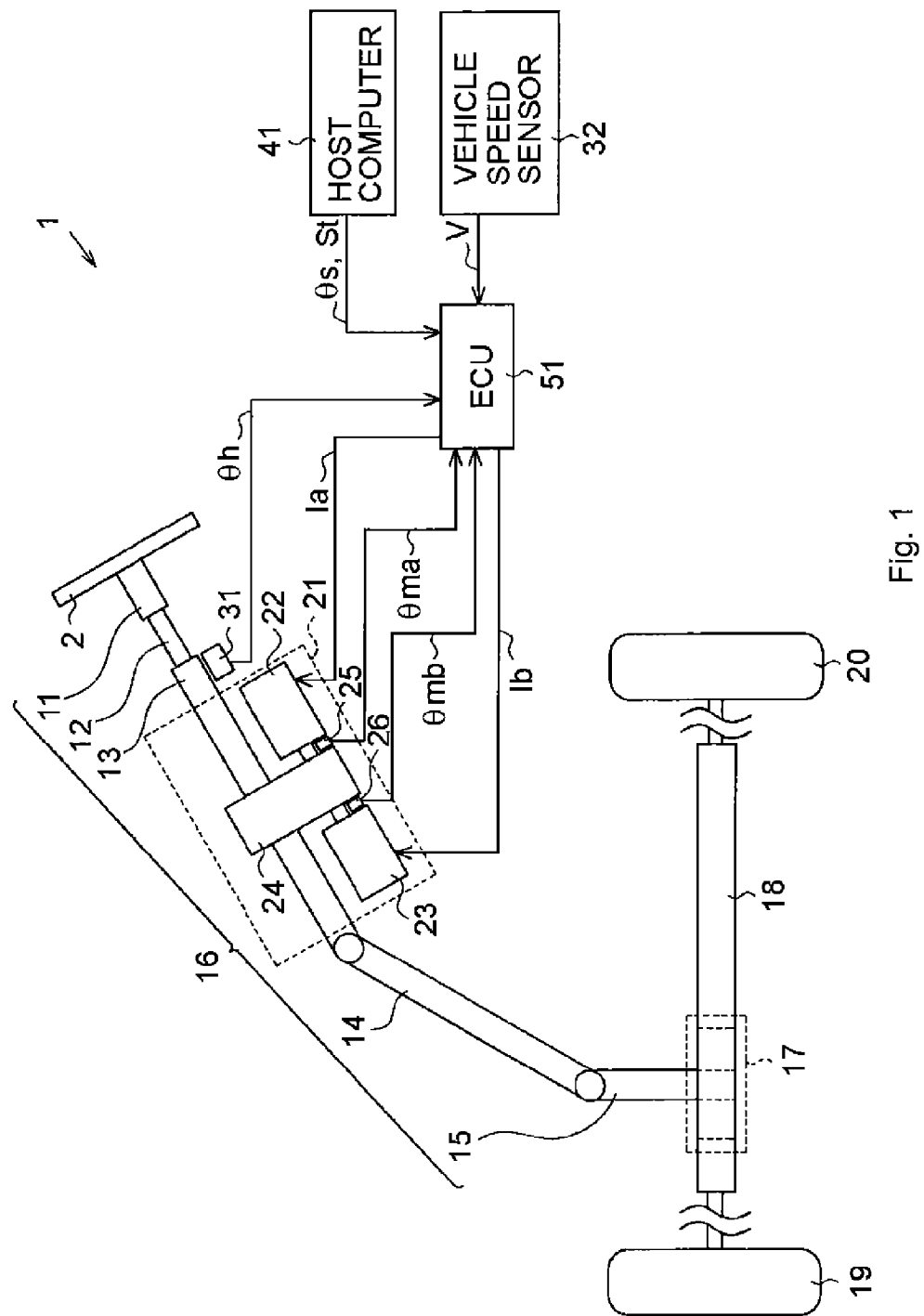
FIG. 1 is a configuration view that shows the overall configuration of a vehicle steering system according to an embodiment of the invention.

As shown in FIG. 1, the overall configuration of a vehicle steering system 1 will be described. A steering wheel 2 is coupled to a column shaft 13 via an input shaft 11 and a torsion bar 12. The column shaft 13 is coupled to a pinion shaft 15 via an intermediate shaft 14. A steering shaft 16 is formed of the input shaft 11, the torsion bar 12, the column shaft 13, the intermediate shaft 14 and the pinion shaft 15. A rack shaft 18 is coupled to the pinion shaft 15 by a rack-and-pinion mechanism 17.

An automatic steering actuator 21 includes a first electric motor 22, a second electric motor 23, a speed reduction mechanism 24, a first rotation angle sensor 25, and a second rotation angle sensor 26. The first electric motor 22 rotates a first rotor on the basis of a first current Ia supplied from an ECU 51. The second electric motor 23 rotates a second rotor on the basis of a second current Ib supplied from the ECU 51. The speed reduction mechanism 24 reduces the speed of rotation of the first rotor and the speed of rotation of the second rotor, and transmits the rotations with reduced speeds to the column shaft 13. The first rotation angle sensor 25 outputs a signal that indicates a first rotation angle θma of the first rotor. The second rotation angle sensor 26 outputs a signal that indicates a second rotation angle θmb of the second rotor.

A steering angle sensor 31 outputs a signal that indicates a rotation angle of the column shaft 13, that is, a steering angle θh. A vehicle speed sensor 32 outputs a signal that indicates a travelling speed V of a vehicle. A host computer 41 calculates a vehicle travelling route and a target route for the vehicle by processing vehicle front view image monitoring data captured by a camera (not shown). The host computer 41 sets one of a right steered wheel 19 and a left steered wheel 20 as a control target St, and calculates a target steered angle θs such that the vehicle travelling route follows the target route. The host computer 41 outputs a signal that indicates the target steered angle θs and the control target St.

The ECU 51 supplies the first current Ia and the second current Ib on the basis of the signals output from the first rotation angle sensor 25, the second rotation angle sensor 26, the steering angle sensor 31, the vehicle speed sensor 32, and the host computer 41.

The vehicle steering system 1 operates as follows. The first electric motor 22 rotates the first rotor upon receiving the first current Ia supplied from the ECU 51, and the second electric motor 23 rotates the second rotor upon receiving the second current Ib supplied from the ECU 51. Thus, the column shaft 13 is rotated via the speed reduction mechanism 24. The rotation of the column shaft 13 is transmitted to the pinion shaft 15 via the intermediate shaft 14. The rotation of the pinion shaft 15 is converted into the axial linear motion of the rack shaft 18 by the rack-and-pinion mechanism 17. With the axial movement of the rack shaft 18, the orientations of the right steered wheel 19 and left steered wheel 20 are changed.

The ratio of an amount of change in steered angle $\theta$ to a rotation amount of the column shaft 13, that is, an amount of change in steering angle $\theta h$, is stored in advance in a storage unit of the ECU 51 as an overall gear ratio.

Figure 2A:
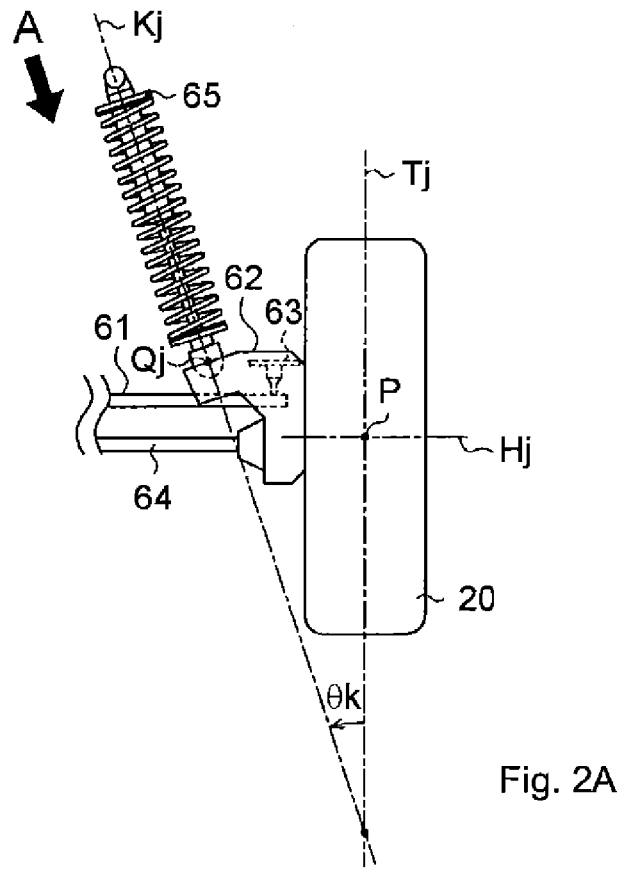
FIG. 2A is a configuration view that schematically shows a steered wheel, a shock absorbing mechanism and a structure near the steered wheel and the shock absorbing mechanism.
Figure 2B:
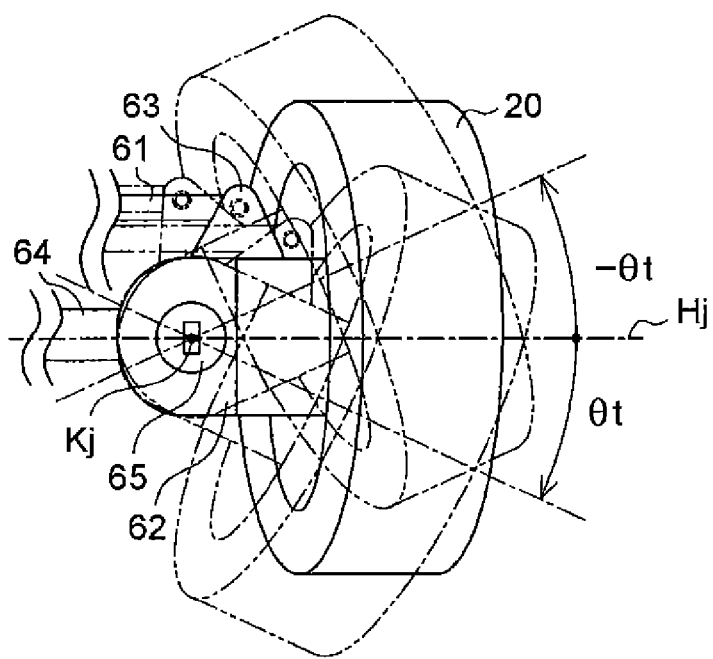
FIG. 2B is a view seen from the direction of an arrow A in FIG. 2A.

A steered element angle $\theta t$ will be described with reference to FIG. 2A and FIG. 2B. As shown in FIG. 2A, the left steered wheel 20 is connected to a knuckle 62 so as to be rotatable around a central axis Hj, which passes through a central point P of the left steered wheel 20 and which extends in the width direction of the left steered wheel 20, in accordance with the rotation of a drive shaft 64.

One end of a shock absorber 65 is pivotably connected to the vehicle. The knuckle 62 is connected to the other end of the shock absorber 65. The knuckle 62 is connected to the shock absorber 65 so as to be rotatable around a central axis Kj that extends in the longitudinal direction of the shock absorber 65 and pivotable about an axis Qj that extends in the longitudinal direction of the vehicle.

In addition, the knuckle 62 is connected to the shock absorber 65 such that the central axis Kj of the shock absorber 65 is inclined by an inclination angle $\theta k$ from a rotational plane toward the drive shaft 64. The rotational plane is formed by rotating an axis Tj, which passes through the central point P of the left steered wheel 20 and extends in the radial direction of the left steered wheel 20, around the central axis Hj of the left steered wheel 20. The knuckle 62 is provided with a knuckle arm 63 that protrudes toward the rear of the vehicle and that is located closer to the rear of the vehicle than the central axis Kj of the shock absorber 65.

A tie rod 61 is movable in the width direction of the left steered wheel 20. One end of the tie rod 61 is rotatably coupled to the knuckle arm 63, and the other end of the tie rod 61 is rotatably coupled to one end of the rack shaft 18. The linear motion of the tie rod 61, which is transmitted to the knuckle arm 63, is converted into the rotational motion of the knuckle 62 about the central axis kj of the shock absorber 65. FIG. 2B is a view seen from the direction of an arrow A in FIG. 2A. As shown in FIG. 2B, when the knuckle 62 rotates around the central axis Kj of the shock absorber 65, the left steered wheel 20 rotates around the central axis Kj with the left steered wheel 20 inclined by the inclination angle $\theta k$ with respect to the central axis Kj.

When the left steered wheel 20 rotates around the central axis Kj, the left steered wheel 20 receives reaction force from a road surface in a direction in which the travelling direction of the vehicle is changed, and a rubber tire portion of the left steered wheel 20 elastically deforms. As a result, an angle made by the travelling direction with respect to the axis that extends in the vehicle longitudinal direction, that is, the steered angle $\theta$, is changed. Hereinafter, the rotation angle of the left steered wheel 20 around the central axis Kj of the shock absorber 65 will be referred to as a steered element angle $\theta t$ that is a rotation angle that is one element used to determine the steered angle $\theta$. In addition, the steered mechanism includes the rack-and-pinion mechanism 17, the rack shaft 18, the tie rod 61, the knuckle 62, the knuckle arm 63, and the shock absorber 65, as its components.

The correlation between the rotation of the column shaft 13 and a change in the steering angle $\theta h$ will be described. As the column shaft 13 rotates in the forward direction, the steering angle $\theta h$ increases. As the column shaft 13 rotates in the reverse direction, the steering angle $\theta h$ decreases. With an increase in steering angle $\theta h$, the steered element angle $\theta t$ increases. With a decrease in steering angle $\theta h$, the steered element angle $\theta t$ decreases. When the steered element angle $\theta t$ decreases, the travelling direction of the vehicle is changed to the left, and the steered angle $\theta$ also decreases. When the steered element angle $\theta t$ increases, the travelling direction of the vehicle is changed to the right, and the steered angle $\theta$ also increases. As shown in FIG. 2B, if the central axis Hj of the left steered wheel 20 in its width direction when the central axis Hj is parallel to the width direction of the vehicle is used as a reference, the steered element angle $\theta t$ takes a positive value when it increases from the reference and takes a negative value when it decreases from the reference. The reference and positive and negative signs of the steering angle $\theta h$ agree with the reference and positive and negative signs of the steered element angle $\theta t$.

Note that the steered element angle $\theta t$ of the right steered wheel 19 is the same as the steered element angle $\theta t$ of the left steered wheel 20, so the description thereof is omitted. In addition, in the following description, the right steered wheel 19 and the left steered wheel 20 will be collectively referred to as steered wheels. In addition, the ratio of an amount of change in the steered element angle $\theta t$ to an amount of change in the steering angle $\theta h$ is equal to the overall gear ratio.

Figure 3:
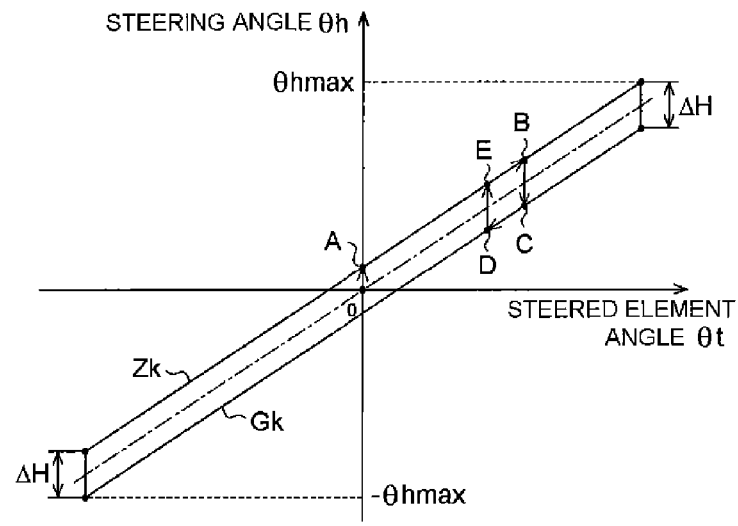
FIG. 3 is a graph that shows the correlation between the steering angle and the steered element angle, which is stored in a control unit for the vehicle steering system.

The correlation between the steering angle $\theta h$ and the steered element angle $\theta t$ (hereinafter, referred to as steered element angle correlation) will be described with reference to FIG. 3. FIG. 3 shows a locus of the steered element angle $\theta t$ when the steering angle $\theta h$ is changed in a reciprocating manner between a lower limit value $-\theta hmax$ and an upper limit value $\theta hmax$. When the rotation torque of the column shaft 13 is transmitted to the steered mechanism, a distortion occurs in the components of the steered mechanism on the basis of the rotation torque and reaction force that the steered wheels receive from a road surface.

Therefore, in a case where the steering angle $\theta h$ increases from 0°, the steered element angle $\theta t$ starts increasing when the steering angle $\theta h$ reaches a point A. In addition, in a case where the steering angle $\theta h$ increases from the point A to a point B and then decreases, the steering angle $\theta h$ decreases by an amount $\Delta H$ and reaches a point C, and then the steered element angle $\theta t$ starts decreasing. Furthermore, in a case where the steering angle $\theta h$ decreases from the point C to a point D and then increases again, the steering angle $\theta h$ increases by the amount $\Delta H$ and reaches a point E, and then the steered element angle $\theta t$ starts increasing. That is, the steered element angle correlation is a correlation in which, when the steering angle $\theta h$ increases or decreases from 0°, there is a dead zone where the steered element angle $\theta t$ remains unchanged despite a change in the steering angle $\theta h$. An increase or decrease in the steering angle $\theta h$ from 0° is a change caused when a turning operation of the steering wheel 2 is started. The size of the dead zone that is formed at this time corresponds to an amount of change that is obtained by dividing the amount $\Delta H$ by two ($\Delta H/2$). In addition, the steered element angle correlation is a correlation in which, when the manner of change in steering angle θh switches from increase to decrease or from decrease to increase, there is a dead zone where the steered element angle θt remains unchanged despite a change in the steering angle θh. A switch in the manner of change in the steering angle θh from increase to decrease or from decrease to increase is caused when a returning operation of the steering wheel 2 is performed. The size of the dead zone that is formed at this time corresponds to an amount of change in the steering angle θh that is equal to the amount ΔH.

As shown in FIG. 3, in the steered element angle correlation, a proportional correlation in the case where the steering angle θh increases so that the travelling direction of the vehicle is changed to the right and the steered element angle θt starts increasing when the steering angle θh exceeds the upper limit value of the dead zone is referred to as an increasing correlation Zk. In addition, as shown in FIG. 3, in the steered element angle correlation, a proportional correlation in the case where the steering angle θh decreases so that the travelling direction of the vehicle is changed to the left and the steered element angle θt starts decreasing when the steering angle θh falls below the lower limit value of the dead zone is referred to as a decreasing correlation Gk.

The correlation between a dead zone of the steered element angle correlation and a travelling speed V will be described with reference to FIG. 4. The solid line in FIG. 4 indicates a steered element angle correlation Da when the travelling speed V is lower than a predetermined speed V1. In addition, the long dashed short dashed line in FIG. 4 indicates a steered element angle correlation Db when the travelling speed V is higher than or equal to the predetermined speed V1 and lower than a predetermined speed V2. In addition, the long dashed double-short dashed line in FIG. 4 indicates a steered element angle correlation Dc when the travelling speed V is higher than or equal to the predetermined speed V2. The steered element angle correlations Da to Dc have dead zones ΔHa to ΔHc, respectively, and the dead zones ΔHa to ΔHc have the relationship, ΔHa<ΔHb<ΔHc. That is, the size of a dead zone that is formed in the steered element angle correlation increases with an increase in the travelling speed V.

Figure 4:
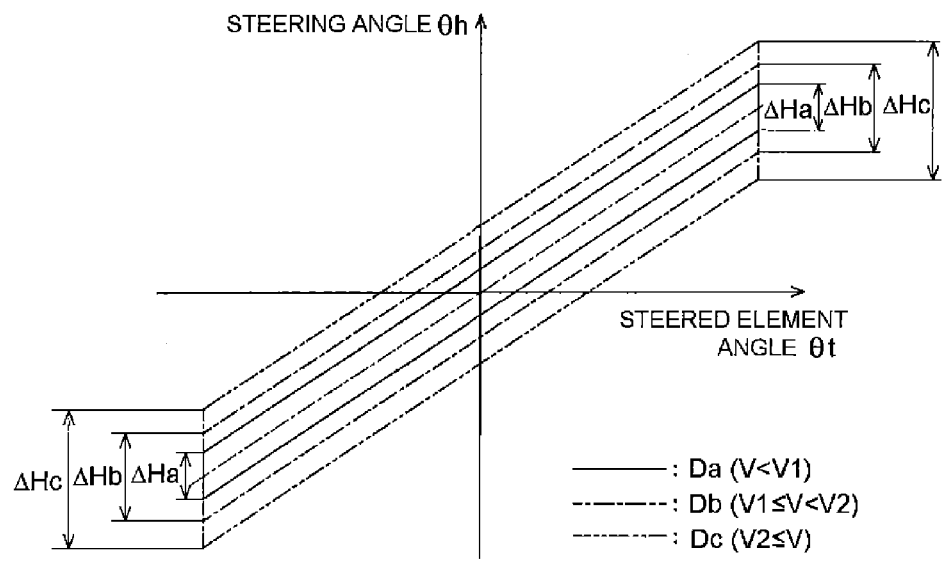
FIG. 4 is a graph that shows the correlation between the steering angle and the steered element angle, which is stored in the control unit for the vehicle steering system, for each travelling speed of a vehicle.

In addition, it is possible to acquire, in advance, the steered element angle correlations Da to Dc based on the travelling speed V, shown in FIG. 4, for each of the right steered wheel 19 and the left steered wheel 20. Hereinafter, the acquired steered element angle correlations Da to Dc for the right steered wheel 19 will be referred to as right steered element angle correlations, and the acquired steered element angle correlations Da to Dc for the left steered wheel 20 will be referred to as left steered element angle correlations.

The operations of the ECU 51 will be described with reference to FIG. 5 to FIG. 7. The ECU 51 repeatedly executes a steered element angle control process shown in FIG. 5 at predetermined processing intervals. Note that the following description will be made on the assumption that the left steered element angle correlations and the right steered element angle correlations are stored in the ECU 51 in advance.

In step S11, a travelling speed V is acquired from the vehicle speed sensor 32, and a control target St is acquired from the host computer 41. In step S12, the steered element angle correlations Da to Dc of the left steered element angle correlations or the steered element angle correlations Da to Dc of the right steered element angle correlations are selected on the basis of the control target St acquired in step S11.

In step S13, among the steered element angle correlations Da to Dc selected in step S12, the steered element angle correlation corresponding to the travelling speed V acquired in step S11 is selected. In step S14, the target steered angle θs obtained by the host computer 41 is acquired as a target value of the steered element angle θt (hereinafter, referred to as "target steered element angle θts").

In step S15, a difference obtained by subtracting the latest value in the historical data of the steered element angle θt stored through a steered element angle storage process (described later), from the target steered element angle θts acquired in step S14 is calculated as a steered element angle difference θt, and is stored as historical data. In this way, it is possible to recognize a deviation of the current steered angle of the steered wheel, which indicates the current orientation of the steered wheel, from the target steered angle θs calculated as the target orientation of the steered wheel by the host computer 41, as a steered element angle difference Δθt.

In step S16, a steering amount calculation process for calculating a target steering angle θhs on the basis of the steered element angle difference Δθt is executed. The details of the steering amount calculation process will be described later. In step S17, the first current Ia and the second current Ib are supplied on the basis of the first rotation angle θma and the second rotation angle θmb to rotate the column shaft 13 such that the steering angle θh coincides with the target steering angle θhs calculated in step S16.

In step S18, the steered element angle storage process is executed. In the steered element angle storage process, it is determined whether there is a dead zone on the basis of the steering angle θh acquired from the steering angle sensor 31, and a current value of the steered element angle θt is determined and stored. Thus, it is possible to execute feedback control over the steered element angle θt even without using a sensor for detecting the steered element angle θt. The details of the steered element angle storage process will be described later.

The steering amount calculation process in step S16 will be described in detail with reference to FIG. 6. In step S21, the latest value of the steered element angle difference Δθt is converted into a steering angle difference Δθh using the overall gear ratio. In this way, it is possible to convert the difference between the steered element angle θt and the target steered element angle θts into a difference between the steering angle θh and the target value.

In step S22, the steering angle θh is acquired from the steering angle sensor 31, and is stored as the latest value of historical data. In step S23, a value obtained by adding the steering angle difference Δθh to the latest value of the historical data of the steering angle θh is calculated as the target steering angle θhs.

In step S24, it is determined whether a change from the latest value of the steering angle θh to the target steering angle θhs is a change from 0° and whether a change from the immediately preceding value to the target steering angle θhs is a change from increase to decrease or from decrease to increase. In this way, it is possible to determine whether the operation of the steering wheel 2 for causing the steering angle θh to coincidence with the target steering angle θhs corresponds to a start of turning or returning, that is, whether the operation of the steering wheel 2 corresponds to an operation that causes a dead zone.

Figure 5:
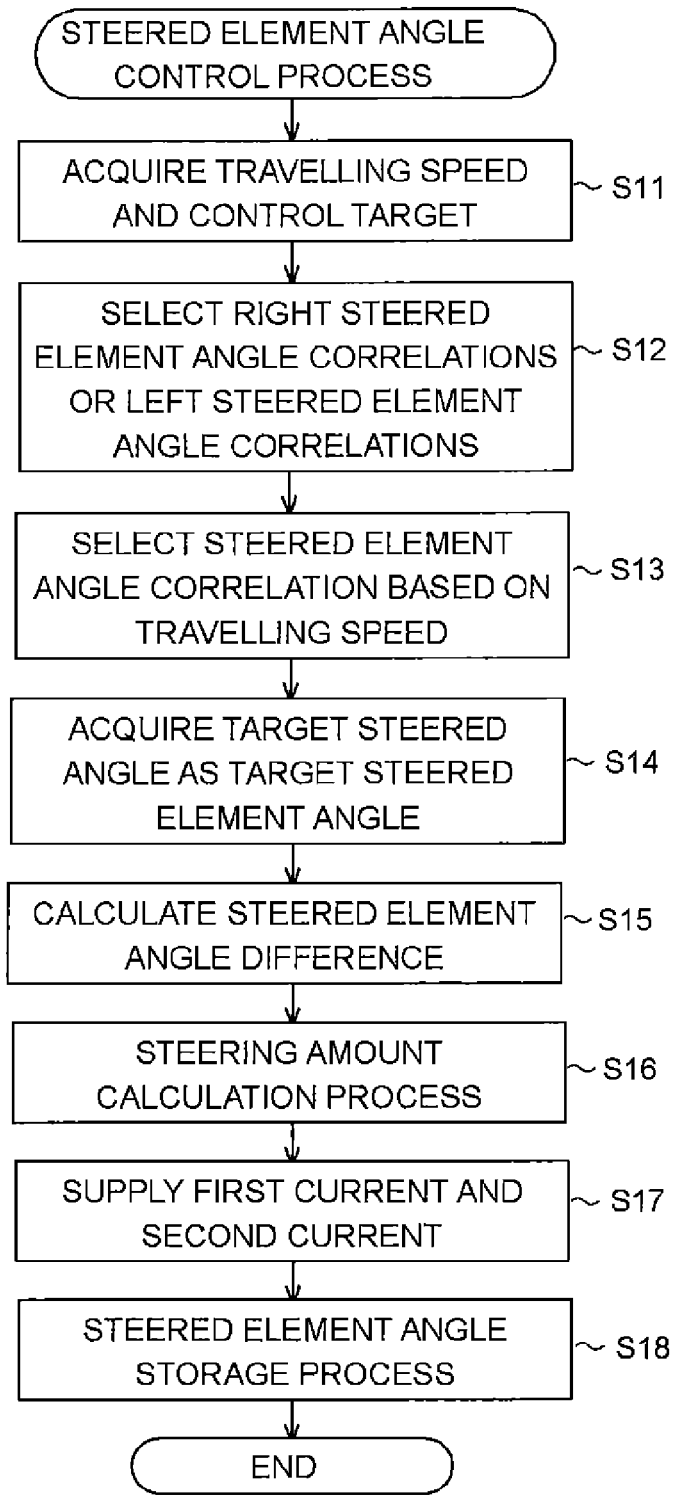
FIG. 5 is a flowchart that shows the procedure of a steered element angle control process executed by the control unit for the vehicle steering system.
Figure 6:
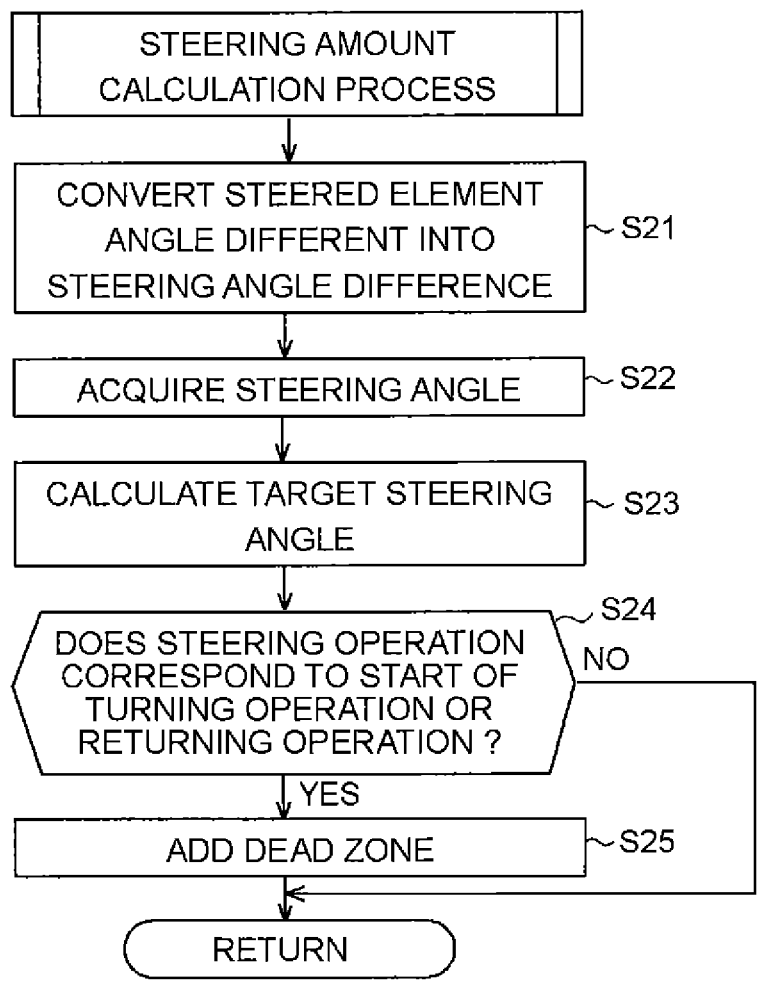
FIG. 6 is a flowchart that shows the procedure of a steering amount calculation process executed by the control unit for the vehicle steering system.
Figure 7:
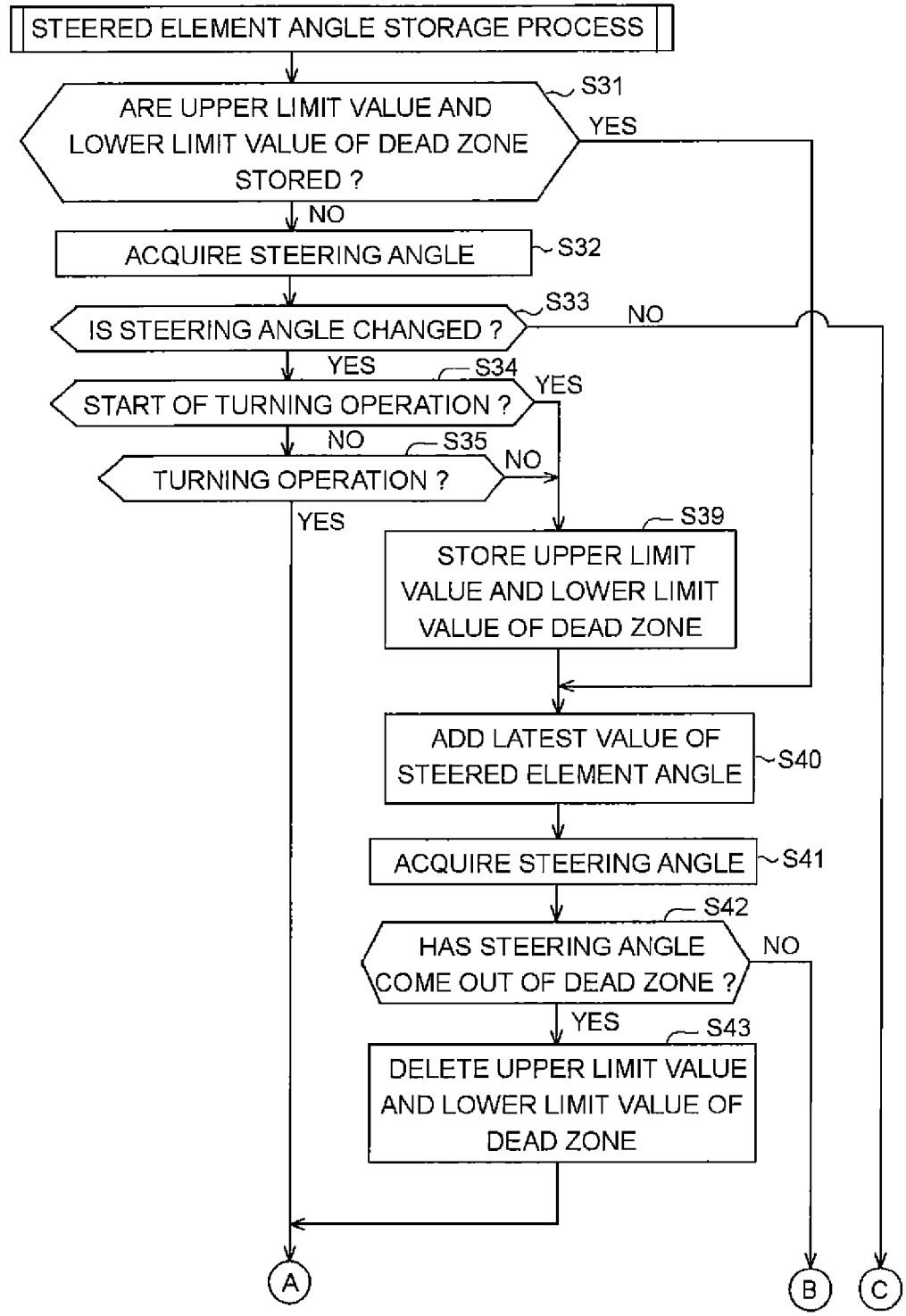
FIG. 7 is a flowchart that shows part of the procedure of a steered element angle storage process executed by the control unit for the vehicle steering system.

When an affirmative determination is made in step S24, in step S25, an amount of change in the steering angle θh, which corresponds to the dead zone of the steered element angle correlations selected in step S12, is added to the target steering angle θhs, the process shown in the flowchart of FIG. 6 ends, and the process in step S17 in the steered element angle control process shown in FIG. 5 is started. Thus, when a dead zone is formed at the time of bringing the steering angle θh to the target steering angle θhs, it is possible to increase an amount of change in the steering angle θh by the amount of the dead zone and cause the actual steered element angle θt to follow the target steered element angle θts acquired from the host computer 41.

Figure 8:
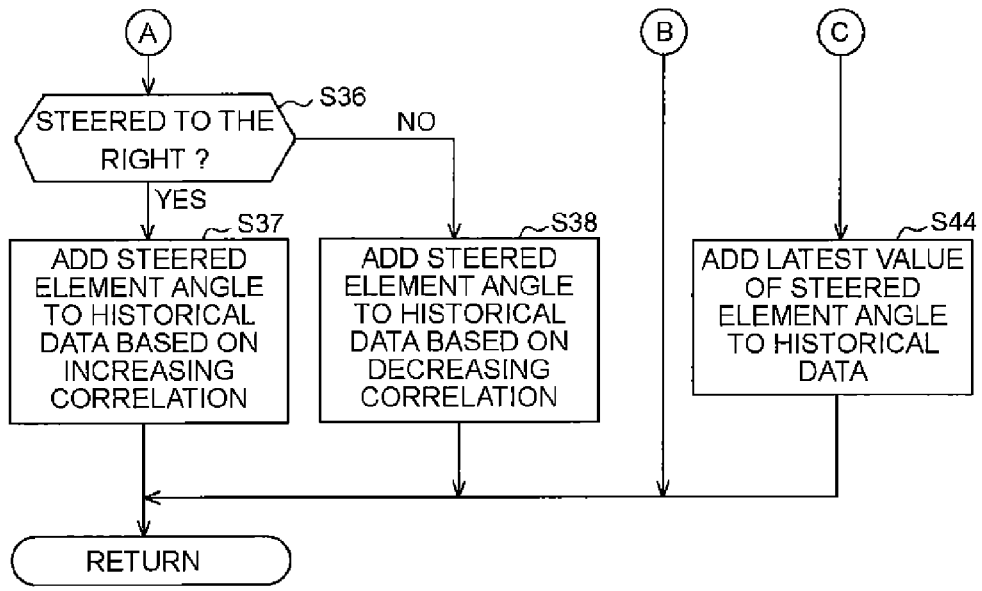
FIG. 8 is a flowchart that shows part of the procedure of the steered element angle storage process executed by the control unit for the vehicle steering system.

When a negative determination is made in step S24, the process shown in the flowchart of FIG. 6 ends, and the process in step S17 in the steered element angle control process shown in FIG. 5 is started. The details of the steered element angle storage process in step S18 will be described with reference to FIG. 7 and FIG. 8.

In step S31, it is determined whether an upper limit value θ×1 and lower limit value θ×2 of the dead zone (described later) are stored. When an affirmative determination is made in step S31, the process proceeds to the process in step S40.

When a negative determination is made in step S31, in step S32, the steering angle θh is acquired from the steering angle sensor 31, and is stored in the storage unit as the latest value of the historical data. In step S33, it is determined whether the latest value is changed from the immediately preceding value of historical data of the steering angle θh.

When a negative determination is made in step S33, the process proceeds to the process in step S44. When an affirmative determination is made in step S33, it is determined in step S34 whether the change in the steering angle θh, which is determined in step S33, corresponds to a start of turning operation of the steering wheel 2.

When an affirmative determination is made in step S34, the process proceeds to the process in step S39. When a negative determination is made in step S34, in step S35, it is determined whether a change from the second preceding value of the steering angle θh to the latest value of the steering angle θh is one of a continuous increase and a continues decrease to determine whether the change in the steering angle θh, which is determined in step S33, corresponds to a turning operation of the steering wheel 2.

Through step S34 and step S35, it is possible to determine whether the change in the steering angle θh, which is determined in step S33, is a change that causes a dead zone. When a negative determination is made in step S35, the process proceeds to the process in step S39. When an affirmative determination is made in step S35, in step S36, it is determined whether the change from the immediately preceding value of the steering angle θh to the latest value of the steering angle θh is an increase to determine whether the change in the steering angle θh, which is determined in step S33, is a change caused by turning the steering wheel 2 clockwise.

When an affirmative determination is made in step S36, in step S37, the steered element angle θt corresponding to the latest value of the steering angle θh on the increasing correlation Zk in the steered element angle correlation selected in step S13 is added to the historical data. Thus, it is possible to add the steered element angle θt, which corresponds to the steering angle θh that has changed in accordance with a clockwise turning operation of the steering wheel 2, to the historical data.

When a negative determination is made in step S36, in step S38, the steered element angle θt corresponding to the latest value of the steering angle θh on the decreasing correlation Gk in the steered element angle correlation selected in step S13 is added to the historical data. Thus, it is possible to add the steered element angle θt, which corresponds to the steering angle θh that has changed in accordance with a counter-clockwise turning operation of the steering wheel 2, to the historical data.

In step S39, the steering angle θh, which corresponds to the latest value of the steered element angle θt in the increasing correlation Zk, is stored as the upper limit value θ×1 of the dead zone. In addition, the steering angle θh, which corresponds to the latest value of the steered element angle θt in the decreasing correlation Gk, is stored as the lower limit value θ×2 of the dead zone. The increasing correlation Zk and decreasing correlation Gk at this time are the increasing correlation Zk and decreasing correlation Gk in the steered element angle correlation selected in step S13.

Through the process in step S39, when it is determined in step S34 or step S35 that a dead zone in which the steered element angle θt remains unchanged despite a change in the steering angle θh is formed, it is possible to store the range of the dead zone as the range of the steering angle θh. In addition, through the process in step S39, before it is determined whether a change in the steering angle θh corresponds to a start of a turning operation of the steering wheel 2 or corresponds to a returning operation, it is possible to determine whether a dead zone is being formed through the process in step S31.

In step S40, the same value as the latest value of the steered element angle θt is added to the historical data. Thus, it is possible to store the steered element angle θt such that when the steering angle θh falls within the range of the dead zone, the steered element angle θt does not change even if the steering angle θh changes.

In step S41, the steering angle θh is acquired from the steering angle sensor 31, and is stored as the latest value of the historical data. In step S42, it is determined whether the latest value of the steering angle θh is larger than or equal to the upper limit value θ×1 or lower than or equal to the lower limit value θ×2, that is, whether the latest value of the steering angle θh has reached one of the limit values of the dead zone. When a negative determination is made in step S42, the process shown in the flowchart of FIG. 7 ends, and the steered element angle control process shown in FIG. 5 ends. When an affirmative determination is made in step S42, in step S43, the upper limit value θ×1 and lower limit value θ×2 of the dead zone are deleted.

In step S44, the same value as the latest value of the steered element angle θt is added to the historical data. Thus, it is possible to store the steered element angle θt that is unchanged because steering angle θh is not changed, as the latest value of historical data.

With the vehicle steering system 1 according to the present embodiment, the following advantageous effects are obtained.

The ECU 51 sets the rotation angle of the knuckle 62, which rotates in accordance with an operation for changing the steered angle θ in the steered mechanism, as the steered element angle θt, and uses the steered element angle θt in the control over the first electric motor 22 and the second electric motor 23.

Because the knuckle 62 rotates in accordance with an operation for changing the steered angle θ in the steered mechanism, only a distortion of the components of the steered mechanism is reflected on the steered element angle θt that is the rotation angle of the knuckle 62. With the above-described configuration, the steered element angle θt is used to control the first electric motor 22 and the second electric motor 23. Therefore, in comparison with a configuration for controlling electric motors without taking into account a distortion of the steered mechanism, it is possible to accurately change the steered angle θ. Therefore, it is possible to reduce a deviation of the vehicle travelling route from the target route for the vehicle.

The vehicle steering system 1 includes the ECU 51 that may function as element angle computing means in which the correlation between the steering angle θh and the steered element angle θt is defined in advance. When the ECU 51 of the vehicle steering system 1 is designed, if the correlation between the actual steering angle θh and the steered element angle θt is acquired in advance, it is possible to set up a configuration that includes the correlation between the steering angle θh and the steered element angle θt, on which a distortion of the components of the steered mechanism is reflected. With the above-described configuration, because the ECU 51 that is configured on the basis of this concept is included, it is possible to accurately change the steered angle θ through the control over the steering angle θh.

The ECU 51 has a dead zone in which the steered element angle θt does not change despite a change in the steering angle θh. In the vehicle steering system 1, there is a range (dead zone) of the steering angle θh in which the steered element angle θt does not change despite a change in the steering angle θh. This is confirmed through the experiment conducted by the inventors of the present invention. In the above-described configuration, a dead zone is set in the ECU 51 on the basis of the above findings. Therefore, it is possible to further accurately control the steered angle θ.

The ECU 51 changes the size of the dead zone in accordance with the travelling speed V of the vehicle. In the vehicle steering system 1, the size of the dead zone changes in accordance with the travelling speed V of the vehicle. This is confirmed through the experiment conducted by the inventors of the present invention. In the above-described configuration, the size of the dead zone is set for each travelling speed V on the basis of the above findings. Therefore, it is possible to further accurately control the steered angle θ.

The vehicle includes the right steered wheel 19 and the left steered wheel 20 as the steered wheels, and the vehicle steering system 1 includes the ECU 51 that may function as first computing means and second computing means. In the first computing means, the correlation between the steering angle θh and the steered element angle θt that corresponds to the left steered wheel 20 is defined. In the second computing means, the correlation between the steering angle θh and the steered element angle θt that corresponds to the right steered wheel 19 is defined.

The correlation between the steered element angle θt and the steering angle θh vary between the left steered wheel 20 and the right steered wheel 19 due to an assembly error of each steered wheel, a manufacturing error of each individual component, and the like. On the basis of this, the above-described configuration includes the ECU 51 that defines the correlation for each of the right steered wheel 19 and the left steered wheel 20 in advance. Therefore, in comparison with a configuration that includes an electronic control unit in which the same correlation is defined for both the right steered wheel 19 and the left steered wheel 20, it is possible to further accurately control the steered angle θ.

The host computer 41 sets the target route on the basis of the vehicle front view image monitoring data, and the ECU 51 acquires the target steered angle θs, which is calculated on the basis of the target route, as the target steered element angle θts, and changes the steering angle θh on the basis of the target steered element angle θts.

With this configuration, the steering angle θh is changed in order to cause the target route set on the basis of the captured image and the actual vehicle travelling route to coincide with each other. Because the first electric motor 22 and the second electric motor 23 are controlled on the basis of the steered element angle θt to change the steering angle θh, the deviation of the actual vehicle travelling route from the target route is decreased.

The invention is not limited to the above-described embodiment. For example, following modifications may be made.

In the above-described embodiment, feedback control is executed. In the feedback control, the steered element angle θt is determined on the basis of the steering angle θh, and the steering angle difference Δθh, that is, the rotation amount of the column shaft 13, is determined using the steered element angle θt instead of an actually detected value. Alternatively, feedforward control may be executed. In the feedforward control, only the above-described steering amount calculation process is executed to determine the rotation amount of the column shaft 13, and the first electric motor 22 and the second electric motor 23 are controlled.

In the above-described embodiment, automatic steering control is executed with the use of the automatic steering actuator 21. Alternatively, a steering torque may be detected by detecting torsion of the torsion bar 12 with the use of a rotation angle sensor, and the automatic steering control may be cancelled when a steering torque is applied by a user during the automatic steering control.

In the above-described embodiment, the steering wheel 2 is mechanically connected to the steered wheels. Alternatively, the invention may be applied to a steer-by-wire vehicle steering system in which the steering wheel 2 and the steered wheels are mechanically independent of each other and the orientation of the steered wheels is changed in accordance with the rotation of the steering wheel 2 by an electric motor.

Figure 9:
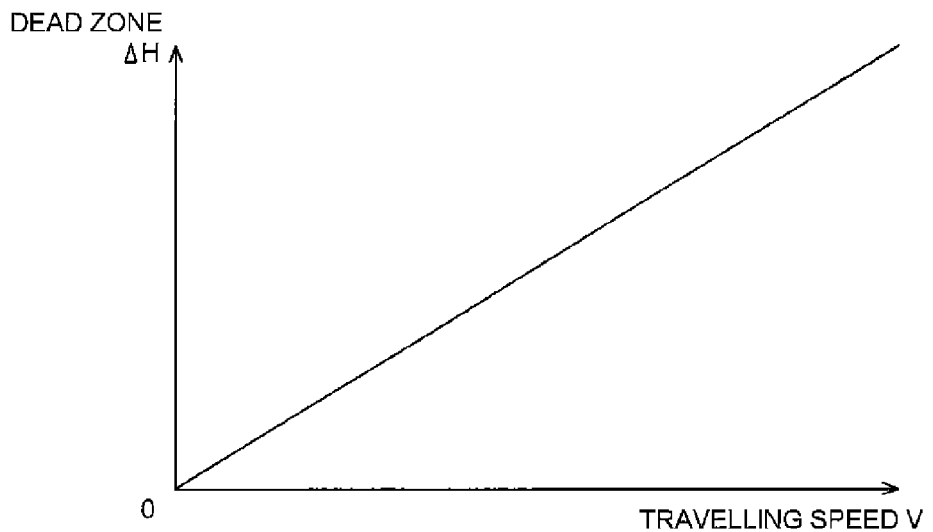
FIG. 9 is a graph that shows the correlation between a travelling speed and a dead zone, which is stored in a control unit for a vehicle steering system according to another embodiment of the invention.

In the above-described embodiment, a plurality of steered element angle correlations based on the travelling speed V is set. Alternatively, as shown in FIG. 9, only one steered element angle correlation may be set and the size of a dead zone may be determined with the use of a dead zone map that is set in advance such that the size of the dead zone increases with an increase in the travelling speed V.

In the above-described embodiment, the steered mechanism has such a structure that the central axis Kj of the shock absorber 65 is inclined by the inclination angle θk toward the drive shaft 64 from the rotational plane that is formed by rotating the axis Tj, which passes through the central point P of the left steered wheel 20 and which extends in the radial direction of the left steered wheel 20, around the central axis Hj which passes through the central point P of the left steered wheel 20 and which extends in the width direction of the left steered wheel 20. In the steered mechanism, the rotation angle of the knuckle 62 around the central axis Kj is set as the steered element angle θt. However, as long as the steered element angle θt is a rotation angle of a steered rotation member that rotates in accordance with an operation for changing the steered angle θ in the steered mechanism, the steered element angle θt may be any rotation angle.

In the above-described embodiment, the steered element angle θt is calculated on the basis of the detected steering angle θh, and then the target steering angle θhs is determined on the basis of the calculated steered element angle θt. Alternatively, the target steering angle θhs may be determined on the basis of the steered element angle θt detected by a sensor.

In the above-described embodiment, the components of the steered mechanism include the rack-and-pinion mechanism 17, the rack shaft 18, the tie rod 61, the knuckle 62, the knuckle arm 63 and the shock absorber 65. Alternatively, the components of the steered mechanism may further include coupling members, such as a universal joint that is interposed between the above-described components and other members associated with the above-described components.

In the above-described embodiment, the strut-type shock absorber 65 is used. Alternatively, the invention may be applied to vehicles that include other suspension mechanisms, such as a swing axle-type suspension mechanism and a double wishbone-type suspension mechanism.

What is claimed is:

1. A control unit for a vehicle steering system, comprising:
a steered mechanism that steers a wheel of a vehicle upon receiving rotation of a steering shaft, the steering shaft being used to change a steered angle, which is a turning angle of a steered wheel of the vehicle; and
an electric motor that is used to change a steering angle, which is a rotation angle of the steering shaft, the control unit controlling the electric motor to change the steering angle based on a target route for the vehicle, wherein
a steered element angle, which is a rotation angle of a steered rotation member that rotates in accordance with an operation for changing the steered angle in the steered mechanism, is used in control over the electric motor,
the control unit further comprises element angle computing means in which a correlation between the steering angle and the steered element angle is predefined, and the element angle computing means has a dead zone in which the steered element angle remains unchanged despite a change in the steering angle.

2. The control unit according to claim 1, wherein the element angle computing means changes a size of the dead zone based on a travelling speed of the vehicle.

3. The control unit according to claim 1, wherein the vehicle includes a left steered wheel and a right steered wheel as the steered wheels, and the element angle computing means includes first computing means in which a correlation between the steering angle and the steered element angle that corresponds to the left steered wheel is defined and second computing means in which a correlation between the steering angle and the steered element angle that corresponds to the right steered wheel is defined.

4. The control unit according to claim 1, wherein a route that is set based on vehicle front view image monitoring data is set as the target route, and the steering angle is changed based on the target route.

* * * * *